US012759418B2

(12) United States Patent
Fella et al.

(10) Patent No.: US 12,759,418 B2
(45) Date of Patent: Oct. 13, 2026

(54) POWER LINE ASSEMBLY AND MOTOR VEHICLE

(71) Applicant: Bayerische Motoren Werke Aktiengesellschaft, Munich (DE)

(72) Inventors: Benedikt Fella, Dachau (DE); Hannes Kirr, Bernau am Chiemsee (DE); Christian Maier, Eichenau (DE); Stephan Riess, Friedberg (DE); Markus Vock, Garching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/881,876

(22) PCT Filed: Jun. 28, 2023

(86) PCT No.: PCT/EP2023/067572
§ 371 (c)(1),
(2) Date: Jan. 7, 2025

(87) PCT Pub. No.: WO2024/046617
PCT Pub. Date: Mar. 7, 2024

(65) Prior Publication Data

US 2026/0014882 A1 Jan. 15, 2026

(30) Foreign Application Priority Data

Aug. 29, 2022 (DE) ..................... 10 2022 121 731.0

(51) Int. Cl.
*B60L 53/18* (2019.01)
*B60L 53/16* (2019.01)
(Continued)

(52) U.S. Cl.
CPC ............... *B60L 53/18* (2019.02); *B60L 53/16* (2019.02); *H01B 1/023* (2013.01); *H02G 3/03* (2013.01)

(58) Field of Classification Search
None
See application file for complete search history.

(56) References Cited

U.S. PATENT DOCUMENTS

2010/0294531 A1 11/2010 Wefers
2014/0197792 A1* 7/2014 Weber ..................... B60L 53/16 320/109

(Continued)

FOREIGN PATENT DOCUMENTS

DE 10 2007 027 858 A1 12/2008
DE 10 2014 010 346 B3 11/2015

(Continued)

OTHER PUBLICATIONS

International Search Report (PCT/ISA/210) issued in PCT Application No. PCT/EP2023/067572 dated Sep. 29, 2023 with English translation (6 pages).

(Continued)

*Primary Examiner* — Daniel C Puentes
*Assistant Examiner* — Aqeel H Bukhari
(74) *Attorney, Agent, or Firm* — Crowell & Moring LLP

(57) ABSTRACT

A power line assembly for conducting electric power from a charging socket of a motor vehicle to an energy storage device of the motor vehicle includes a direct-current line with two individual direct-current lines for conducting a direct current from a direct-current interface of the charging socket to the energy storage device, and an alternating-current line with a plurality of individual alternating-current lines for conducting an alternating current from an alternating-current interface of the charging socket to the energy
(Continued)

storage device, wherein each of the individual direct-current lines has a profiled aluminum section as an electric conductor for conducting the direct current.

8 Claims, 2 Drawing Sheets

(51) Int. Cl.
*H01B 1/02* (2006.01)
*H02G 3/03* (2006.01)

(56) References Cited

U.S. PATENT DOCUMENTS

| | | | |
|---|---|---|---|
| 2017/0253134 A1 | 9/2017 | Berger et al. | |
| 2018/0277283 A1* | 9/2018 | Remisch | B60L 53/16 |
| 2019/0111866 A1 | 4/2019 | Ito et al. | |
| 2019/0259511 A1 | 8/2019 | Ooi et al. | |
| 2020/0127426 A1* | 4/2020 | Wimmer | H02G 11/00 |
| 2021/0394626 A1 | 12/2021 | Genece et al. | |
| 2022/0085557 A1 | 3/2022 | Rhodes et al. | |

FOREIGN PATENT DOCUMENTS

| | | |
|---|---|---|
| DE | 10 2014 223 585 A1 | 5/2016 |
| DE | 11 2017 003 271 T5 | 3/2019 |
| DE | 11 2017 005 624 T5 | 7/2019 |
| WO | WO 2016/020512 A1 | 2/2016 |

OTHER PUBLICATIONS

German-language Written Opinion (PCT/ISA/237) issued in PCT Application No. PCT/EP2023/067572 dated Sep. 29, 2023 with English translation (10 pages).
German-language Search Report issued in German Application No. 10 2022 121 731.0 dated Apr. 12, 2023 with partial English translation (12 pages).

* cited by examiner

POWER LINE ASSEMBLY AND MOTOR VEHICLE

BACKGROUND AND SUMMARY

The present disclosure relates to a conductor assembly for conducting electric current from a charging socket of a motor vehicle to an energy storage device of a motor vehicle. The disclosure further relates to a motor vehicle.

The progressive transition of mobility is a critical factor in the increasing necessity for environmental sustainability. For this and other reasons, the production and use of electric vehicles are key elements in the achievement of more sustainable mobility. A core constituent of an electric vehicle is the charging system or charging unit, which runs from an energy storage device via a conductor assembly to a charging socket. At the charging socket, an off-board charging station can be connected, in order to charge the energy storage device.

The charging unit comprises the conductor assembly and a charging terminal or interface for connecting the conductor assembly to the charging socket, together with an interface to the energy storage device. The conductor assembly or conductor cable runs between the energy storage device and the charging socket. This charging unit is typically a coherently constructed component.

The motor vehicle can typically be charged with an alternating current (AC) or a direct current (DC) by an alternating current (AC) cable bundle and a direct current (DC) cable bundle respectively.

According to the prior art, the DC cable bundle is typically comprised of two circular copper conductors. For current transmission, respectively, one of the circular conductors is positively charged and one is negatively charged. Copper is an appropriate material for the circular conductors on the grounds that, in addition to the fundamental requirement for current-carrying capacity, it is mechanically flexible, and can thus offset tolerances in the arrangement of the charging unit or charging socket and the energy storage device.

However, in the case of direct currents, copper is subject to a comparatively high thermal input. Copper is comparatively cost-intensive, and has a comparatively high mass.

WO 2016/020512 A1 discloses a vehicle having a storage device for electrical energy, which is rechargeable by a charging cable and an external power supply, and having bodywork which comprises at least one bodywork opening which is closeable by a body hatch, wherein a charging cable is provided, which is connected or connectable to the storage device in an electrically conductive manner and is at least intermittently routed in the interior of the bodywork, characterized in that the bodywork opening is a trunk opening or a door opening, and the bodywork hatch is a trunk hatch or a vehicle door; in that the charging cable is configured as a flexible flat ribbon cable, or comprises at least one flexible flat ribbon cable section; in that the flexible flat ribbon cable, or the at least one flexible flat ribbon cable section can be led through a bodywork gap which is present between the bodywork opening and the body hatch, and in that the flat ribbon cable, or the at least one flexible flat ribbon cable section comprises current-carrying conductors which are arranged next to one another, which are configured as flat, ribbon-shaped conductors, and which are enclosed in a common electrically insulating sheath.

In the context of this prior art, an object of the present disclosure is an improved conductor assembly which is appropriate for the enrichment of the prior art. A specific configuration of the disclosure fulfils this object by the provision of a cost-effective, lightweight and low-maintenance conductor assembly, which eliminates heat-related issues in a comparatively effective manner.

This object is fulfilled by the features of the present disclosure. Further developments are also the subject matter of the present disclosure.

Accordingly, this object is fulfilled by a conductor assembly for conducting electric current from a charging socket of a motor vehicle to an energy storage device of the motor vehicle. The conductor assembly comprises a direct current line having two individual direct current conductors for conducting a direct current from a direct current interface of the charging socket to the energy storage device, and an alternating current line having a plurality of individual alternating current conductors for conducting an alternating current from an alternating current interface of the charging socket to the energy storage device. Each of the individual direct current conductors comprises a profiled aluminum section, by way of an electrical conductor for conducting the direct current.

The conductor assembly is thus arranged within the motor vehicle, between the charging socket and the energy storage device. The conductor assembly comprises the direct current line and the alternating current line, in order to enable combined charging. Accordingly, both a direct current charging method and an alternating current charging method can be executed for charging the energy storage device.

The direct current line comprises the two individual direct current conductors, wherein one of the individual direct current conductors corresponds to a positive pole, and the other of the individual direct current conductors corresponds to a negative pole.

The alternating current line comprises the plurality of individual alternating current conductors. Charging can thus be executed with a multi-phase alternating current and/or a three-phase alternating current.

The direct current line and the alternating current line are respectively designed, via a corresponding interface, to be connected to the energy storage device. For charging the battery cells of the energy storage device, the energy storage device can comprise power electronics for converting the direct current and/or the alternating current.

Each of the individual direct current conductors comprises a profiled aluminum section, by way of an electrical conductor for conducting direct current. A profiled aluminum section is thus provided for conducting the direct current. Aluminum is lighter than copper and, as a result of effective recyclability, can be accessed in a cost-effective manner. Moreover, aluminum has a comparatively high thermal conductivity. The configuration of individual direct current conductors as profiled sections can improve the thermal radiation and/or thermal conduction of a heated direct current line, and thus enable an effective cooling of the direct current line. A charging time for charging the energy storage device can thus be reduced. A profiled section is, for example, a part which is shaped from a flat blank.

The profiled aluminum sections of the individual direct current conductors can be arranged parallel to one another. In part, magnetic fields from the two individual direct current conductors can thus cancel each other out. When current flows through a conductor, an electromagnetic field is generated. As the two profiled aluminum sections are charged in mutual opposition, the two electromagnetic fields thus generated partially cancel each other out, and fewer additional measures, if any, are required for the neutralization of electromagnetic fields. By the proposed positioning of the profiled aluminum sections, the achievement of limiting values for electromagnetic compatibility is facilitated. Electromagnetic compatibility (EMC) describes the capability of a technical device to avoid any disturbance of other devices by unwanted electrical and/or electromagnetic effects, or to withstand disturbance from other devices.

The profiled aluminum sections can be flat profiled sections. This means that the profiled aluminum sections have two primary directions of extension, in which the profiled aluminum sections assume a larger extension than in a further direction of extension. It has been observed that round profiled aluminum sections are comparatively rigid, and cannot offset any potential tolerances in the arrangement of the charging unit and the energy storage device. Configuration in the form of a flat profiled section provides the requisite flexibility of profiled aluminum sections. Flat profiled sections are comparatively flexible, and can appropriately offset tolerances of this type in a motor vehicle.

A heat-absorbing paste can be arranged between the individual direct current conductors. A thermal paste, for example of a "LH2C" formulation, is applied between the two profiled aluminum sections. This paste has a high thermal capacity, and can absorb heat from the conductors. This results in an increased current-carrying capacity and a reduced charging time wherein, additionally, heat absorption by a heat-absorbing paste applied between the profiled aluminum sections is more cost-effective than active cooling.

The above-mentioned arrangement can be summarized in different terms, and with respect to a specific configuration which is not described by way of limitation of the present disclosure, as follows: it is proposed that the two circular copper conductors of the DC charging system are replaced by two flat aluminum profiled sections. The flat profiled sections are arranged in mutual opposition such that, in part, magnetic fields from the two flat profiled conductors cancel each other out. When current flows through a conductor, an electromagnetic field is generated. As the two flat profiled sections are charged in mutual opposition, the two electromagnetic fields thus generated partially cancel each other out, and no additional measures are required for the neutralization of electromagnetic fields. Electromagnetic compatibility (EMC) describes the capability of a technical device to avoid any disturbance of other devices by unwanted electrical and/or electromagnetic effects, or to withstand disturbance from other devices. By the proposed positioning of the flat profiled sections, the achievement of limiting values for EMC is facilitated. The employment of aluminum, as opposed to copper, enables a reduction of costs, more effective heat evacuation capabilities, and thus a shorter charging time. However, round profiled aluminum sections are highly rigid, and cannot permit the offsetting of any potential tolerances between the charging unit and the high-voltage store. Moreover, the charging unit is comprised of multiple components, as a result of which tolerances between the individual components of the charging unit are required. By the alteration of shape, the requisite flexibility of profiled aluminum sections is provided. Flat profiled sections are more flexible, and can offset tolerances more effectively. In order to achieve a shorter charging time, and a higher charging efficiency, it is important to maintain a low temperature in the charging path. As a result of resistance in the conductors, heat is released which, firstly, can influence the surroundings (sheathing) and secondly, with effect from a specific temperature, reduces charging capacity. Air and water cooling are not appropriate, as they have disadvantages in the following respects: complexity, costs, volume (structural space) and weight. Thermal cooling is thus proposed in the form of a thermal compound (LH2C) between the two flat profiled aluminum sections. A thermally conductive paste of a LH2C formulation is applied between the two profiled aluminum sections. This paste has a high thermal capacity, and can absorb heat from the conductors.

A motor vehicle is further provided. The motor vehicle comprises a charging socket, an energy storage device and the above-mentioned conductor assembly.

The motor vehicle can be a passenger motor vehicle, in particular an automobile. The motor vehicle can be an electrically powered motor vehicle. To this end, the motor vehicle can comprise an electric drive, which can be energized by electrical energy from the energy storage device, in order to convert electrical energy into kinetic energy. The optionally automated motor vehicle can be configured to at least partially and/or at least intermittently assume a longitudinal and/or a lateral control during an automated driving of the motor vehicle. Automated driving can be executed such that the forward motion of the motor vehicle is executed in a (substantially) autonomous manner. Automated driving can be at least partially and/or intermittently controlled by a data processing device. The motor vehicle can be a motor vehicle of automation level 0 to 5.

The subject matter described above with reference to the conductor assembly also applies, in an analogous manner, to the motor vehicle, and vice versa.

An exemplary embodiment is described hereinafter with reference to FIGS. 1 to 4.

DETAILED DESCRIPTION OF THE DRAWINGS

Figure 1:
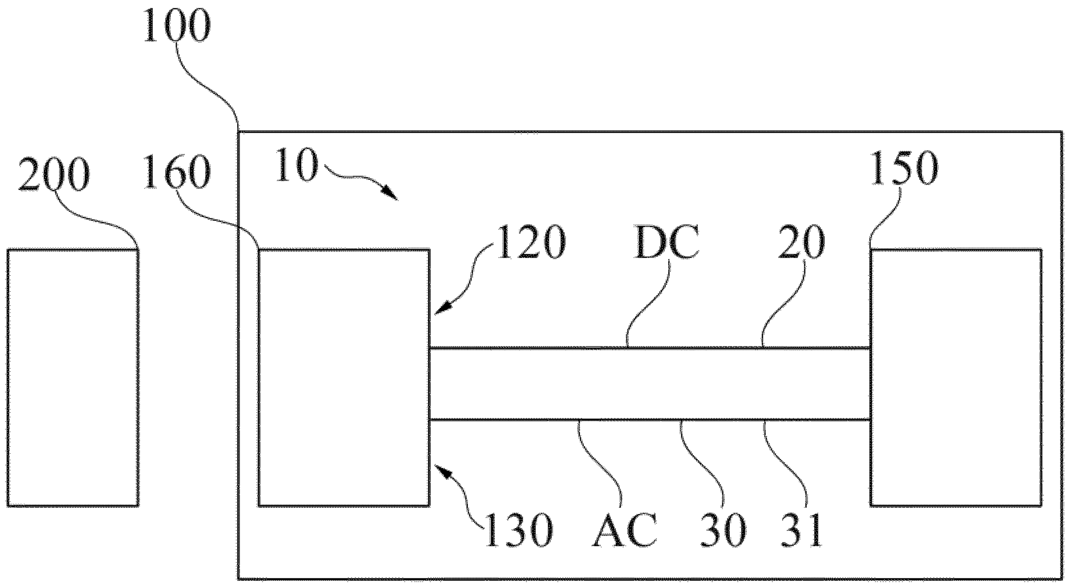
FIG. 1 shows a schematic representation of a motor vehicle according to one embodiment of the disclosure.

FIG. 1 shows a schematic representation of a motor vehicle 100 according to one embodiment of the disclosure.

The motor vehicle 100 comprises a charging socket 160, an energy storage device 150 and a conductor assembly 10. The charging socket 160 is designed to establish an electrical connection between the motor vehicle 100 and an off-board charging station 200. Moreover, the motor vehicle 100, or the energy storage device 150 thereof, can be energized by an electric current.

To this end, the charging socket 160 is connected to the energy storage device 150, for the conduction of electric current via the conductor assembly 10. The conductor assembly 10 is designed for conducting electric current from the charging socket 160 to the energy storage device 150.

The conductor assembly 10 comprises a direct current line 20 and an alternating current line 30.

The direct current line 20 is designed for conducting a direct current DC from a direct current interface 120 of the charging socket 160 to the energy storage device 150. The alternating current line 30 is designed for conducting an alternating current AC from the alternating current interface 130 of the charging socket 160 to the energy storage device 150.

The alternating current line 30 comprises a plurality of individual alternating current conductors 31 (in the interests of more effective representation, only one individual alternating current conductor 31 is illustrated).

The conductor assembly 10 is also described with reference to FIGS. 2 to 4.

Figure 2:
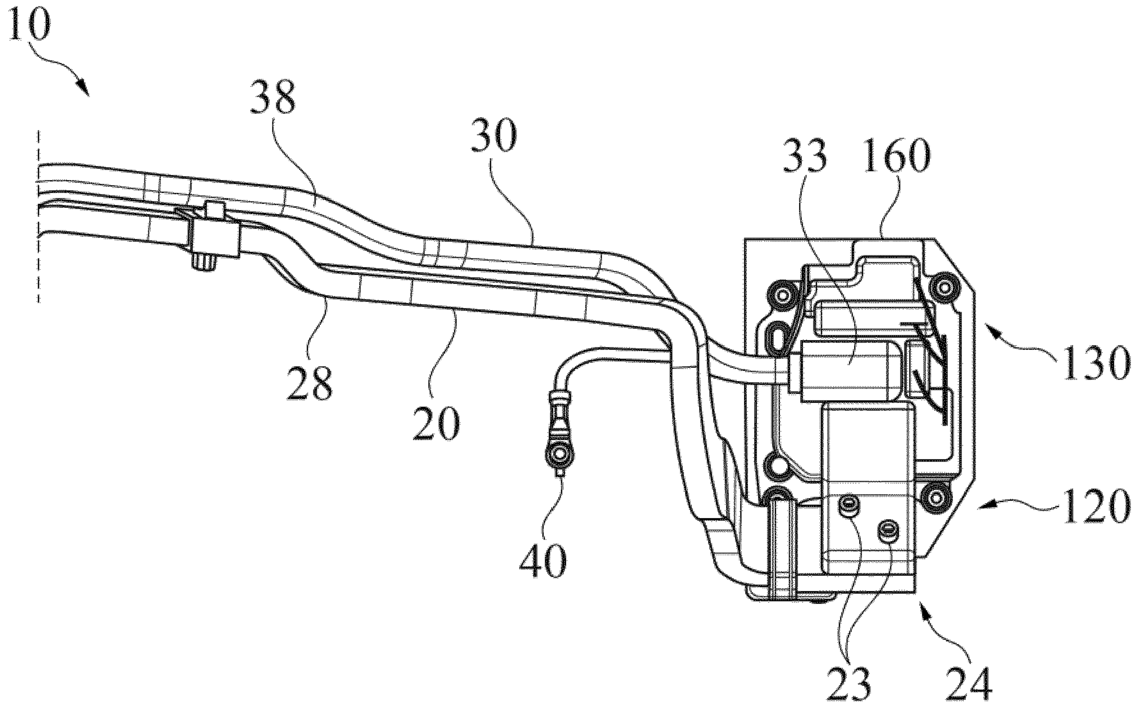
FIG. 2 shows a perspective view of a conductor assembly according to one aspect of the disclosure.

FIG. 2 shows a perspective view of a conductor assembly 10 according to one aspect of the disclosure. The conductor assembly 10 is a conductor assembly 10 for a motor vehicle 100. A motor vehicle 100 of this type is described with reference to FIG. 1. FIG. 2 is described with reference to FIG. 1, and the description thereof.

The alternating current line 30 according to FIG. 2 comprises a plurality of individual alternating current conductors 31 which are arranged in a sheathing 38, and which are electrically insulated from one another. The individual alternating current conductors 31 are formed, for example, of copper, and each assumes a circular cross-section. The sheathing 38 is electrically insulating, and is formed, for example, of a plastic.

The conductor assembly 10 comprises a plug-in alternating current connection 33, which is connectable to the alternating current line 30. The plug-in alternating current connection 33 is designed to connect the conductor assembly 10 to the alternating current interface 160. The plug-in alternating current connection 33 comprises a plug and an associated socket (not represented). At an unrepresented end of the alternating current line 30, the conductor assembly 10 comprises a further plug-in alternating current connection 33, which is designed to connect the conductor assembly 10 to the energy storage device 150. Thus, by the plug-in alternating current connection 33 and the alternating current line 30, the energy storage device 150 can be electrically connected to the charging socket 160 for the transmission of an alternating current AC.

As represented in FIG. 2, the direct current line 20 is designed to be fastened to the direct current interface 120, in an electrically conductive manner, by a screw connection 24 comprising a plurality of screws 23. A screw connection 24 of this type is described in detail with reference to FIG. 4. At one end of the direct current line 20, which is not represented in FIG. 2, the direct current line 20 is designed to be fastened to the energy storage device 150, by a further screw connection 24 comprising a plurality of screws 23. Thus, by the screw connections 24 and the direct current line 20, the energy storage device 150 is electrically connected to the charging socket 160 for the transmission of a direct current DC. The direct current line 20 is described in greater detail with reference to FIG. 3.

As represented in FIG. 2, the conductor assembly 10 comprises a ground connection 40 for connecting to the motor vehicle 100.

Figure 3:
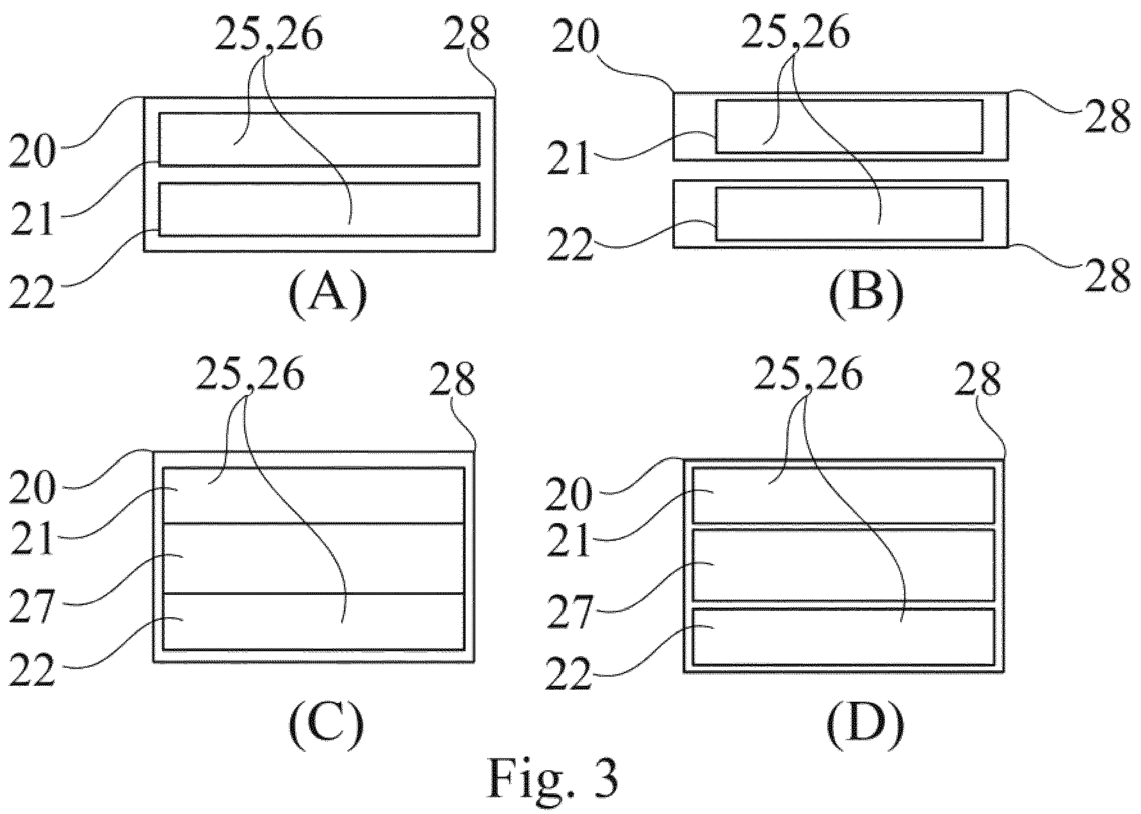
FIG. 3 shows respective cross-sectional views of a direct current conductor in a conductor assembly according to one aspect of the disclosure.

FIG. 3 shows respective cross-sectional representations of a direct current line 20 of a conductor assembly 10 according to one aspect of the disclosure. FIG. 3 shows the conductor assembly 10 described with reference to FIGS. 1 and 2. FIG. 3 is described with reference to FIGS. 1 and 2, and the descriptions thereof.

FIG. 3 shows four different embodiments of the direct current line 20 (FIGS. 3(A), 3(B), 3(C) and 3(D)).

According to FIG. 3, the direct current line 20 comprises two individual direct current conductors 21, 22 for conducting a direct current DC. Each of the individual direct current conductors 21, 22 comprises a profiled aluminum section 25, by way of an electrical conductor for conducting the direct current DC. The profiled aluminum sections 25 are flat profiled sections 26. This means that each of the profiled aluminum sections 25 comprises two primary directions of extension, in the present case horizontal, projecting into the drawing plane, and a further direction of extension, in the present case vertical. The extension of the profiled aluminum sections 25 in the primary directions of extension is greater than in the further direction of extension. The profiled aluminum sections 25 can be formed, for example, by rolling and shaping.

The profiled aluminum sections 25 of the individual direct current conductors 21, 22 are configured in a mutually parallel arrangement. The respective primary directions of extension of the profiled aluminum sections 25 define a plane in which the profiled aluminum sections 25 respectively assume their most extensive surface area. The profiled aluminum sections 25 of the individual direct current conductors 21, 22 are arranged such that the largest surface areas thereof are mutually arranged in parallel.

The direct current line 20 comprises an insulation 28. The insulation 28 is arranged around the individual direct current conductors 21, 22 and between the individual direct current conductors 21, 22. The insulation 28 is electrically insulating and is formed, for example, of a plastic.

FIG. 3(B) is described with reference to distinctions vis-à-vis FIG. 3(A). According to FIG. 3(B), the direct current line 20 comprises an insulation 28. The insulation 28 is respectively arranged about the individual direct current conductors 21, 22. An air gap is arranged between the insulations 28 of the individual direct current conductors 21, 22. The air gap can enable an improved evacuation of heat from the individual direct current conductors 21, 22 to a surrounding environment.

FIG. 3(C) is described with reference to distinctions vis-à-vis FIG. 3(A). According to FIG. 3(C), the direct current line 20 comprises a heat-absorbing paste 27, which is arranged between the individual direct current conductors 21, 22.

In comparison with aluminum, the heat-absorbing paste 27 has a high thermal capacity, and is designed to absorb heat which is generated in the direct current line 20 during a charging process. The temperature of the direct current line 20 thus rises less strongly, which can thus be conducive to charging.

The heat-absorbing paste 27 has a semi-solid consistency. Correspondingly, the heat-absorbing paste 27 can thus be effectively applied to the potentially curved outline (see FIG. 2) of the direct current line 20.

The heat-absorbing paste 27 contacts the individual direct current conductors 21, 22 on one of the largest respective surfaces thereof, in order to enable an effective transfer of heat from the respective individual direct current conductors 21, 22 to the heat-absorbing paste 27. The heat-absorbing paste 27 is electrically insulating, and thus forms an electrical insulation between the individual direct current conductors 21, 22.

FIG. 3(D) is described with reference to distinctions vis-à-vis FIG. 3(C). According to FIG. 3(D), the sheathing 28 is arranged to enclose the heat-absorbing paste 27. The heat-absorbing paste 27 assumes no direct electrical contact with the individual direct current conductors 21, 22. Accordingly, an electrically conductive heat-absorbing paste 27 can also be employed.

Figure 4:
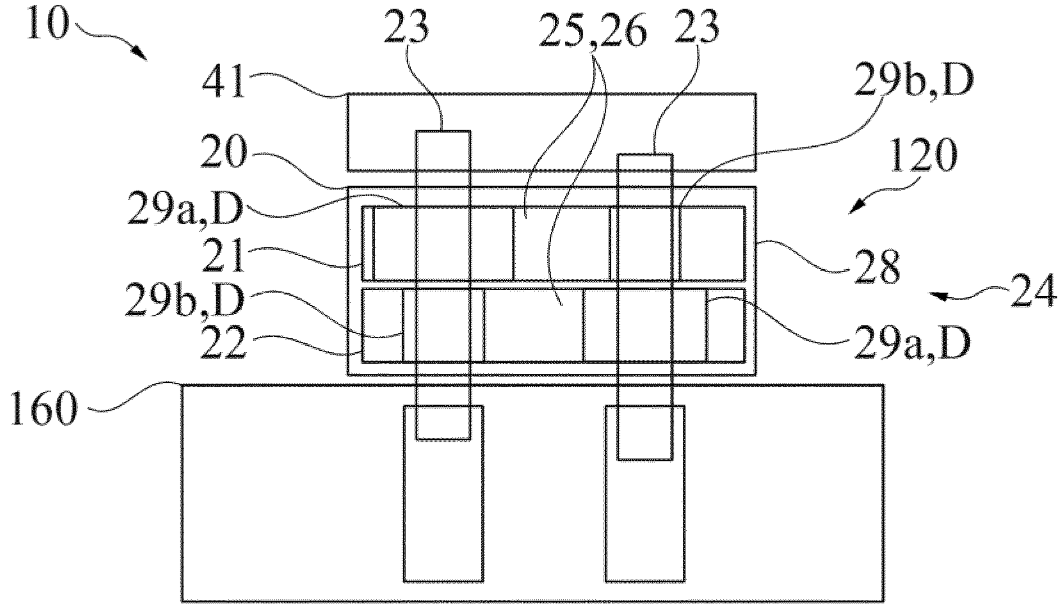
FIG. 4 shows a schematic representation of a screw connection of a conductor assembly according to one aspect of the disclosure.

FIG. 4 shows a schematic representation of a screw connection 24 of a conductor assembly 10 according to one aspect of the disclosure. FIG. 4 represents the conductor assembly 10 described with reference to FIGS. 1 to 3. FIG. 4 is described with reference to FIGS. 1 to 3 and the descriptions thereof.

The direct current line 20 is fastened to the direct current interface 120, in an electrically conductive manner, by a screw connection 24 comprising two screws 23. Each of the screws 24, in the assembled state, is arranged perpendicularly to one of the profiled aluminum sections 25. Each of the screws 24 thus contact-connects exactly one of the profiled aluminum sections 25 in an electrically conductive manner.

Each of the profiled aluminum sections 25 comprises a first feed-through opening 29*a* and a second feed-through opening 29*b* for a respective feed-through of one of the screws 24. The feed-through openings 29*a*, 29*b* of each of the profiled aluminum sections 25 assume a different diameter D. In other words, each of the profiled aluminum sections 25 comprises a feed-through opening 29*a* having a diameter D which is greater than the diameter D of the other feed-through opening 29*b*. In the feed-through openings 29*b* having the smaller respective diameter D, a tolerance margin is provided in each case, i.e. the diameter D of the respectively smaller feed-through opening 29*b* is somewhat larger than the diameter of the screws 24. The diameter D of the respectively smaller feed-through opening 29*b* is selected such that a reliable mechanical and electrical connection between the individual direct current conductors 21, 22 and the charging socket 160 is enabled. The diameter D of the respectively larger feed-through opening 29*a* is selected such that a contact of the screw 24 with the respective individual direct current conductors 21, 22 at the larger feed-through opening 29*a* is excluded. For example, the larger feed-through opening 29*a* assumes a diameter D which is equal to a multiple of the diameter of the screws 24.

The screws 24 are led perpendicularly through the individual direct current conductors 21, 22, such that one screw 24 is only in contact with one of the individual direct current conductors 21, 22 respectively. The two screws 24 are in contact with respectively differing individual direct current conductors 21, 22. Both screws 24 are led through both the individual direct current conductors 21, 22, but engage in contact with only one of the individual direct current conductors 21, 22 respectively. Connection of a screw 24 and the individual direct current conductors 21, 22 for an electrical connection or disconnection is provided by a smaller or larger clearance between the screw 24 and the individual direct current conductors 21, 22, i.e. resulting from the differing diameters of the feed-through openings 29*a*, 29*b*.

The conductor assembly 10 comprises a cover plate 41 or contact guard. The cover plate 41 is electrically insulating. By the cover plate 41, the screw connection 24 can be protected against mechanical influences.

LIST OF REFERENCE SYMBOLS

10 Conductor assembly
20 Direct current line
21 Individual direct current conductor
22 Individual direct current conductor
23 Screw connection
24 Screw
25 Profiled aluminum section
26 Flat profiled section
27 Heat-absorbing paste
28 Insulation
29*a* First feed-through opening
29*b* Second feed-through opening
30 Alternating current line
31 Individual alternating current conductors
33 Alternating current plug-in connection
38 Sheathing
40 Ground
41 Cover plate
100 Motor vehicle
120 Direct current interface
130 Alternating current interface
150 Energy storage device
160 Charging socket
200 Charging station
AC Alternating current
DC Direct current
D Diameter

The invention claimed is:

1. A conductor assembly for conducting electric current from a charging socket of a motor vehicle to an energy storage device of the motor vehicle, the conductor assembly comprising:

a direct current line comprising two individual direct current conductors configured to conduct a direct current from a direct current interface of the charging socket to the energy storage device;

an alternating current line comprising a plurality of individual alternating current conductors configured to conduct an alternating current from an alternating current interface of the charging socket to the energy storage device; and a heat-absorbing paste arranged between the individual direct current conductors, wherein each of the individual direct current conductors comprises a profiled aluminum section by way of an electrical conductor for conducting the direct current.

2. The conductor assembly according to claim 1, wherein the profiled aluminum sections of the individual direct current conductors are configured in a mutually parallel arrangement.

3. The conductor assembly according to claim 1, wherein the profiled aluminum sections are flat profiled sections.

4. A motor vehicle, comprising:

a charging socket;

an energy storage device; and the conductor assembly according to claim 1.

5. The conductor assembly according to claim 1, wherein the heat-absorbing paste is comprises a semi-solid consistency.

6. The conductor assembly according to claim 1, wherein the heat-absorbing paste directly contacts at least one of the two individual direct current conductors and is electrically insulating.

7. The conductor assembly according to claim 1, comprising:

an insulation arranged around the two individual direct current conductors, wherein the heat-absorbing paste directly contacts the insulation that is located between the two individual direct current conductors.

8. The conductor assembly according to claim 1, comprising:

a screw connection configured to fasten the direct current line to the direct current interface, the screw connection comprising a plurality of screws, wherein each of the profiled aluminum sections comprises a first feed-through opening and a second feed-through opening for a respective feed-through of one of the plurality of screws, and wherein the first feed-through opening and the second feed-through opening of each of the profiled aluminum sections have different diameters such that each individual screw contacts only one of the individual direct current conductors.

* * * * *